United States Patent
Khare et al.

(10) Patent No.: US 11,593,085 B1
(45) Date of Patent: Feb. 28, 2023

(54) DELTA DATA COLLECTION TECHNIQUE FOR MACHINE ASSESSMENT

(71) Applicant: Rapid7, Inc., Boston, MA (US)

(72) Inventors: Shreyas Khare, Toronto (CA); Taylor Osmun, Fredericton (CA); Paul-Andrew Joseph Miseiko, Mississauga (CA); Sheung Hei Joseph Yeung, Toronto (CA); Ross Barrett, York (CA)

(73) Assignee: Rapid7, Inc., Boston, MA (US)

( * ) Notice: Subject to any disclaimer, the term of this patent is extended or adjusted under 35 U.S.C. 154(b) by 130 days.

(21) Appl. No.: 16/780,691

(22) Filed: Feb. 3, 2020

(51) Int. Cl.
| | |
|---|---|
| *G06F 8/65* | (2018.01) |
| *G06F 21/57* | (2013.01) |
| *G06F 16/23* | (2019.01) |
| *G06F 16/11* | (2019.01) |
| *G06F 16/178* | (2019.01) |

(52) U.S. Cl.
CPC .............. *G06F 8/65* (2013.01); *G06F 16/11* (2019.01); *G06F 16/128* (2019.01); *G06F 16/178* (2019.01); *G06F 16/2379* (2019.01); *G06F 21/577* (2013.01); *G06F 2221/034* (2013.01)

(58) Field of Classification Search
USPC ....................................................... 707/624
See application file for complete search history.

(56) References Cited

U.S. PATENT DOCUMENTS

| | | | |
|---|---|---|---|
| 6,151,584 A | 11/2000 | Papierniak et al. | |
| 6,347,331 B1 | 2/2002 | Dutcher et al. | |
| 7,073,198 B1 * | 7/2006 | Flowers | H04L 63/1433 726/25 |
| 7,330,871 B2 | 2/2008 | Barber | |
| 8,159,960 B2 * | 4/2012 | Cooppan | H04L 41/142 348/161 |
| 8,307,099 B1 | 11/2012 | Khanna et al. | |
| 8,887,286 B2 | 11/2014 | Dupont et al. | |
| 9,104,331 B2 * | 8/2015 | Hsu | G06F 9/45558 |
| 9,354,928 B1 | 5/2016 | Buchheit | |
| 9,710,475 B1 * | 7/2017 | Sudarsanam | G06F 16/128 |
| 10,176,064 B2 * | 1/2019 | Patnaik | G06F 3/0665 |
| 11,100,130 B2 | 8/2021 | Natanzon et al. | |
| 11,216,563 B1 * | 1/2022 | Veselov | G06F 21/577 |
| 2003/0046442 A1 | 3/2003 | Maryka et al. | |

(Continued)

*Primary Examiner* — Cam Linh T Nguyen
(74) *Attorney, Agent, or Firm* — Ashwin Anand

(57) ABSTRACT

Systems and methods are disclosed to implement a delta data collection technique for collecting machine characteristics data from client machines. In embodiments, the collected data is used by a machine assessment service to maintain a virtual representation of the client machine for assessments. To initialize the collection process, the client uploads an initial copy of the data in full. Subsequently, the client determines periodic deltas between a current baseline of the data and a last reported baseline, and the deltas are uploaded as patches. The machine assessment service then applies these patches to update the virtual representation of the client machine. In embodiments, to facilitate the generation or uploading of the patches, the client may generate the baselines in a different encoding format as used by the data. For example, baselines in the new encoding format may be more easily compared and manipulated during the patch generation process.

20 Claims, 10 Drawing Sheets

(56) References Cited

U.S. PATENT DOCUMENTS

| | | | |
|---|---|---|---|
| 2009/0113412 A1* | 4/2009 | Shribman | G06F 16/10 717/170 |
| 2009/0164522 A1 | 6/2009 | Fahey | |
| 2010/0050169 A1 | 2/2010 | Dehaan | |
| 2012/0158666 A1* | 6/2012 | Anglin | G06F 11/1469 707/679 |
| 2012/0203867 A1* | 8/2012 | Furbeck | H04N 21/23439 709/219 |
| 2012/0216052 A1* | 8/2012 | Dunn | G06F 21/78 713/193 |
| 2013/0212709 A1* | 8/2013 | Tucker | G06F 21/56 726/29 |
| 2014/0095816 A1* | 4/2014 | Hsu | G06F 11/1469 711/162 |
| 2014/0149354 A1* | 5/2014 | Chan | G06F 11/2038 707/639 |
| 2015/0154081 A1* | 6/2015 | Javadekar | G06F 11/1484 707/639 |
| 2016/0055171 A1* | 2/2016 | Araki | G06F 16/184 707/624 |
| 2017/0109234 A1 | 4/2017 | Furman et al. | |
| 2017/0364721 A1 | 12/2017 | Yeakley et al. | |
| 2018/0039710 A1 | 2/2018 | Chen et al. | |
| 2018/0173874 A1* | 6/2018 | Muttik | G06F 21/64 |
| 2019/0303031 A1 | 10/2019 | Sabourin | |
| 2019/0391881 A1 | 12/2019 | Horowitz | |
| 2020/0007158 A1 | 1/2020 | Cooper et al. | |
| 2020/0019466 A1* | 1/2020 | Patwardhan | G06F 9/45558 |
| 2020/0057697 A1* | 2/2020 | Yeung | G06F 9/542 |
| 2020/0233581 A1* | 7/2020 | Chen | G06F 3/067 |
| 2020/0348938 A1* | 11/2020 | Mark | G06F 3/065 |
| 2020/0349030 A1* | 11/2020 | Meadowcroft | G06F 11/1471 |
| 2021/0011666 A1 | 1/2021 | Cully et al. | |
| 2021/0117295 A1* | 4/2021 | Sharma | G06F 11/1451 |
| 2021/0133148 A1* | 5/2021 | Gotkhindikar | G06F 16/128 |

\* cited by examiner

| | |
|---|---|
| *file upload event*<br>*410* | |
| `"job_uuid": "companyX_242093",`<br>`"job_ver": "2.3.4",` | |
| `"object_key": "serverY/appZ/patch_242093.zip",`<br>`"bucket": "storage.provider.com/bucket_3033",`<br>`"object_hash": 92a66c8b6295d094003182106936ab41,`<br>`"size": 130940,` | *uploaded patch*<br>*420* |
| `"prev_key": "serverY/appZ/patch_234927.zip",`<br>`"prev_bucket": "storage.provider.com/bucket_3033",`<br>`"prev_hash": 0959a303ac75b7550b8d9e3c8fdc34ef,` | *previous patch*<br>*430* |
| `"patch_content": {`<br>    `"appZ/config.txt": {`<br>        `"operation": "copy_from_patch"`<br>    `},` | *patch content*<br>*440*<br><br>*operation 442* |
|     `"appZ/component_list": {`<br>        `"operation": "copy_from_snapshot"`<br>    `},` | *operation 444* |
|     `"appZ/temp_data": {`<br>        `"operation": "remove_from_snapshot"`<br>    `},` | *operation 446* |
|     `"appZ/exec_log": {`<br>        `"operation": "apply_patch",`<br>        `"target_hash":`<br>            `7011d5e8a0f9aabefc8c993a534c616d`<br>    `}`<br>`}` | *operation 448* |

DELTA DATA COLLECTION TECHNIQUE FOR MACHINE ASSESSMENT

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g. data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security management systems have become increasingly important to protect company networks against these types of vulnerabilities.

An enterprise security management system may operate as a remote service that periodically collects data from computing resources within the company network. In some cases, it may be desirable to obtain a full copy of a particular type of machine characteristics data from a client machine in the company network. For example, it may be useful to obtain all registry data from a WINDOWS machine. With the full copy of the data, the enterprise security management system can perform a more thorough analysis of the client machine and detect issues more quickly. However, the full copy of the data may be quite large. For example, the WINDOWS registry of a single machine may be hundreds of megabytes. The repeated uploading of this amount of data from each client machine and for each collection cycle can create a significant burden on the company's network and resources, even when the data has not substantially changed between collection cycles. Better approaches are needed to perform this type of bulk data collection on an ongoing basis, without placing excessive strain on the company network and resources.

SUMMARY OF EMBODIMENTS

The systems and methods described herein may be employed in various combinations and in embodiments to implement a delta data collection technique for collecting machine characteristics data from client machines. In embodiments, a machine assessment service may collect data from a large number of client machines to build virtual representations of the machines for analysis. To initialize the collection process, a client machine performs a one-time upload of a full copy of the data. Subsequently, the client machine will upload successive patches that indicate deltas or changes to the data. Each delta may be determined from a current baseline of the data and a last reported baseline store by the client machine. The machine assessment service will apply the successive patches to update the virtual representation of the client machine. In embodiments, to facilitate the generation and uploading of the patches, the client machine may generate the baselines in an encoding format that is different from the encoding format of the machine characteristics data. For example, machine characteristics data in a binary encoding format may be converted to baselines in a text encoding format, so that the baselines can be more easily compared and manipulated during the patch generation process.

BRIEF DESCRIPTION OF THE DRAWINGS

FIG. 4 illustrates an example file upload event generated by an agent that implements a delta data collection process, according to some embodiments.

Figure 1:
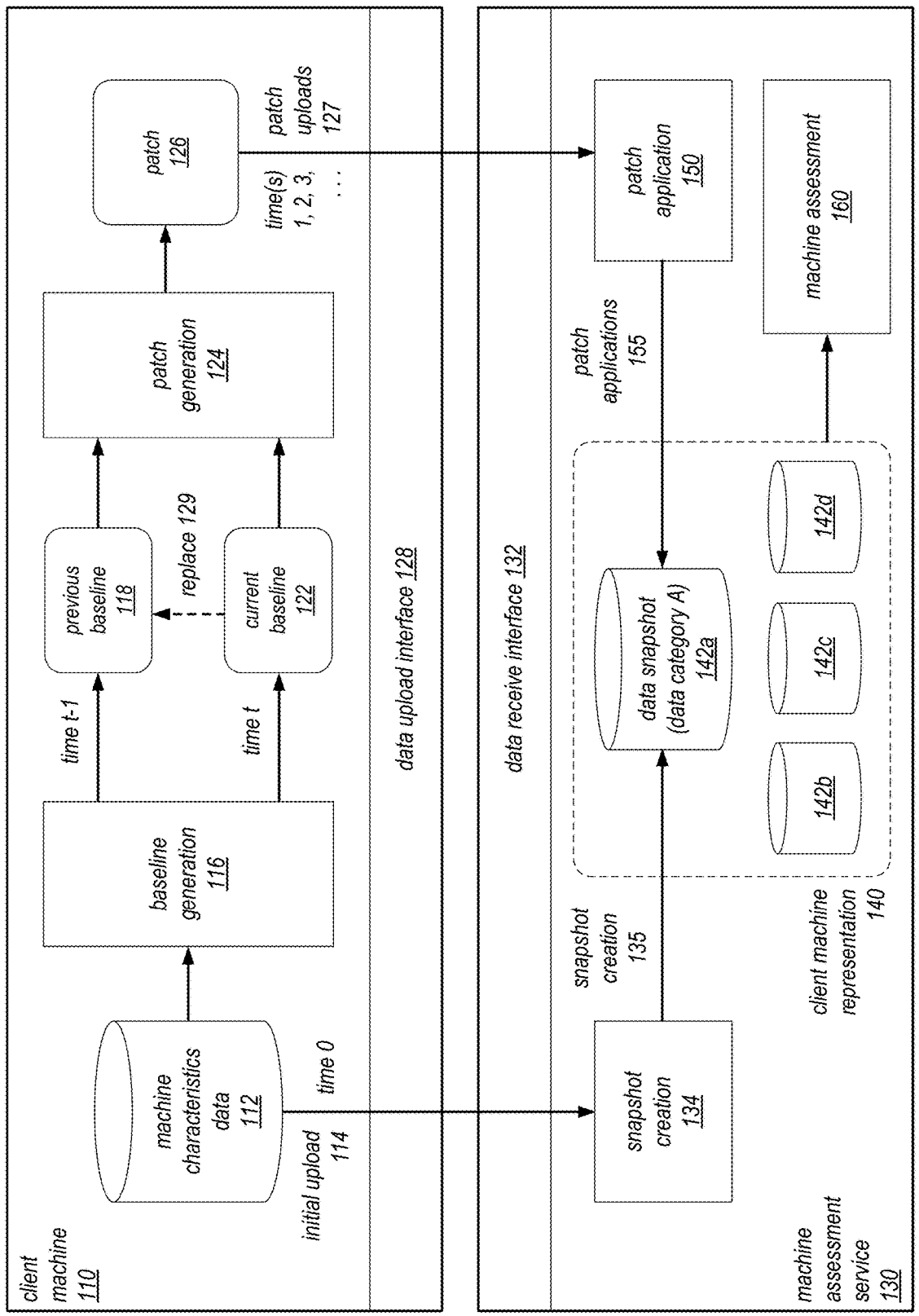
FIG. 1 is a block diagram illustrating an example client machine and machine assessment service that implement a delta data collection technique for collecting machine characteristics data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Enterprise security management systems may periodically collect machine characteristics data from the computing resources in a company network in order to observe and assess these resources. In some cases, it may be desirable to obtain a full copy of a particular type of machine characteristics data from a client machine in the company network. For example, it is often useful to obtain all registry data from a WINDOWS machine. With the full copy of the data, the enterprise security management system can perform a more thorough analysis of the client machine and detect issues more quickly. However, the full copy of the data can be quite large. For example, the full WINDOWS registry of a single machine may be hundreds of megabytes. The repeated uploading of this amount of data from each client machine and for each collection cycle can create a significant burden on the company's network and resources, even though the data has not substantially changed between collection cycles.

Accordingly, embodiments of a delta data collection system are disclosed herein to collect machine characteristics data from client machines in successive delta patches. To initialize the collection process, a client machine performs a one-time upload of a full copy of the data. Subsequently, the client machine uploads successive patches that indicate deltas or changes to the data. The client machine may determine each delta from a current baseline of the data and a last reported baseline stored at the client machine. The machine assessment service will apply the successive patches to update a virtual representation of the client machine.

Advantageously, the disclosed delta collection system drastically reduces the amount of data that needs to be uploaded to the machine assessment service, which in turn reduces the network and resource utilization in the client network. At each collection cycle, only a small patch of data changes is uploaded to the machine assessment service. In some embodiments, if there are no changes, no patch is uploaded at all. Depending on the embodiment, the client machines may report patches according to a set schedule (e.g. once every few hours), or in response to trigger conditions such as events on the client machine (e.g. a change in the data) or requests from a user or the machine assessment service.

In some embodiments, the machine assessment service is configured to perform a variety of security vulnerability assessments of large numbers of client machines based on machine characteristics data collected by respective agents executing on the machines. Moreover, the machine assessment service may implement multiple independent delta collection processes to collect different categories of machine characteristics data. For example, different delta collection processes may be implemented to collect configuration data of different applications installed on the client machine. Each of delta collection process may be used to maintain a different snapshot of the machine characteristics data of that category. The different snapshots may be combined to create an up-to-date virtual representation of the client machine.

In some embodiments, to facilitate the generation and uploading of the patches, the client machine may generate the baselines in an encoding format that is different from the encoding format of the machine characteristics data. For example, the registry data of a WINDOWS machine are stored in binary blobs called hives. Baselines of these hives may be exported in a text encoding format, as .reg files. The .reg files may be generated in a manner that sorts its keys in a deterministic (e.g., alphanumeric) ordering. The patch may then be generated by performing a textual diff of two .reg files: a current baseline exported at the time of collection, and the last baseline exported at the last collection. The delta between the two baselines may be captured in another .reg file, which is uploaded as a patch for the registry data.

The format conversion in this context facilitates the comparison of the two baselines. As may be appreciated by those skilled in the art, a byte-for-byte diff of two registry hive binaries can generate a large number of differences. Hive binaries can organize the same data in many different ways, and the literal differences between two hive binaries are not are always semantically meaningful. The text files provide additional advantages in that they are human-readable, which allows generated patches to be manually inspected. Additionally, use of the text format allows the patches to be filtered using custom filtering rules to exclude certain registry data that are not relevant to machine assessments.

In some embodiments, the machine assessment service will apply registry data patches to a static registry hive maintained by the machine assessment service. The static registry hive is maintained in hive form so that it can be accessed more efficiently by the assessment service. In some embodiments, the application of the patches may be performed by a custom hive writer. Unlike the hive utilities provided with WINDOWS, the custom hive writer can be used to update a static registry hive that is not being actively used by a WINDOWS machine. The custom hive writer can be augmented with custom functionality such as specialized filtering, translation, or memory allocation policies. In some embodiments, a customer hive writer may employ an efficient memory allocation policy to reuse memory locations for new or changed registry entries, so as to reduce the number of new pages that are generated during a registry update.

In some embodiments, the delta data collection system may implement a validation mechanism to validate the snapshot after a patch has been applied. The validation may be implemented by comparing two check values: a check value computed from the current baseline at the client machine, and another check value computed from the snapshot at the machine assessment service. The check value may be computed as a checksum, a hash value, or some other type of value. In some embodiments, if the snapshot fails validation, the machine assessment service may instruct the client machine to upload the full baseline and rebuild the snapshot from the baseline.

In some embodiments, the machine assessment service may store patches received from a client machine in a patch history repository. The patches maybe stored in a chain, where each patch is identified by a chain identifier. The machine assessment service may maintain a common view of the next chain ID with the client machine, and increment the chain ID with each patch upload. In some embodiments, if the client machine reports an old chain ID with a new patch, the machine assessment service may recognize this as a cloning or reversion of the client machine. In that event, the machine assessment service may create a new snapshot for the cloned client machine by applying the received patch to an earlier snapshot in the chain, and instruct the client machine to generate a new identifier (e.g. a new agent ID) to be used for subsequent patch uploads. In some embodiments, the history chains maintained by the machine assessment service may be used to generate useful metrics about the client machine.

As will be appreciated by those skilled in the art, the disclosed features of the delta data collection system provide numerous technical improvements to enhance the functioning of existing data collection systems in the state of the art. These and other features and benefits of the disclosed delta data collection system are described in further detail below, in connection with the figures.

FIG. 1 is a block diagram illustrating an example client machine and machine assessment service that implement a delta data collection technique for collecting machine characteristics data, according to some embodiments.

As shown, the depicted system is implemented using a client machine 110 and a machine assessment service 130. In some embodiments, the depicted operations on the client machine 110 may be performed by an agent executing on the client machine, which is configured to communicate with the machine assessment service over one or more networks, to collect and report machine characteristics data 112 about the client machine to the machine assessment service. In some embodiments, the machine assessment system 130 may be implemented as a cloud-based or network-accessible service, which is configured to receive machine characteristics data from a large number of different client machines and perform security vulnerability assessments on remote machines based on the received data. In some embodiments, each collection agent on the client machines may be assigned a unique agent ID that identifies the agent to the machine assessment service.

Depending on the embodiment, the machine characteristics data 112 may include various types of information that are used by the machine assessment service to assess the machine 110. For example, the machine characteristics data 112 may include information such as the machine's operating system (OS) version, OS patches installed on the machine, installed applications and their version information, patches, settings, and metadata, various files or file contents on the machine, and configuration data such as the machine's registry entries, security settings, logged events, performance data and metrics, etc., among other information. In some embodiments where the client machine is a WINDOWS machine, the machine characteristics data 112 may include the WINDOWS registry of that machine. The WINDOWS registry may be stored in a set of binary blobs called hives, which contain metadata about the hardware, software, and user information about the client machine. In some embodiments, the collection scope of the machine 110 is controlled by a collection rule set that specifies what machine data to collect.

As shown, the delta collection process may include an initialization operation where an initial upload 114 of the machine characteristics data 112 is made to the machine assessment service (at time 0). In embodiments where the machine characteristics data 112 is WINDOWS registry data, the initial upload 114 may be uploaded in a binary encoding format, as a registry hive blob. The initial upload 114, which is a relatively large upload, may be performed as a one-time step, and the machine characteristics data will not be uploaded again in full unless some error (e.g. a loss of synchronization) occurs in the delta collection process.

As shown, the client machine 110 may implement a data upload interface 128, which contains components to carry out the upload. In some embodiments, the data upload interface 128 may be configured to communicate with a data receive interface 132 of the machine assessment service, for example, via a specialized application programming interface (API), a service interface, or a network communication protocol. In some embodiments, the data receive interface 132 may be implemented as a web service with a RESTful API. In some embodiments, the two interfaces 128 and 132 may implement secure communicate channels such as transport layer security (TLS) connections. In some embodiments, the data upload interface 128 may compress the initial upload 114 using one or more data compression techniques, such as gzip or Lempel-Ziv-Welch (LZW). In some embodiments, due to its size, the initial upload 114 may be broken up into smaller portions and uploaded separately by the data upload interface 128, and in turn, the data receive interface 132 will reassemble the portions to reconstruct the upload.

As shown, when the initial upload is received at the machine assessment service 130, it may be used by a snapshot creation component 134 to create 135 a data snapshot 142a of the machine characteristics data 112. In some embodiments, the creation of the snapshot 142a may involve allocating a storage location and storage space at the machine assessment system for the snapshot 142a, and copying the uploaded machine characteristics data 112 to that storage location. Depending on the embodiment, the snapshot 142a may be stored using a variety of storage systems, such as a structured database (e.g. a SQL database), a key-value data store, a file system, or another type of storage system.

As shown, the data snapshot 142a may be one of a number of data snapshots 142a-d maintained by the machine assessment service 130. In some embodiments, the machine assessment service may implement a number of delta collection processes for different categories of machine characteristics data, and maintain different snapshots (e.g. snapshots 142a-d) using the different data collection processes. For example, the different snapshots 142a-d may correspond to application metadata of different applications, different metadata repositories of the client machine, different semantic groupings of metadata, etc. In some embodiments, a different snapshot 142a-d may be maintained for each WINDOWS registry hive blob on the client machine 110. These snapshots 142 may be kept up-to-date using their respective delta collection processes, and together, they may provide a combined virtual representation 140 of the client machine to be used for machine assessment purposes. In some embodiments, the virtual representation 140 may be seen as the definitive representation of the client machine 110 in the machine assessment system 130, so that all machine assessments 160 of the client machine 110 are performed against the representation 140.

As shown, after the initial upload 114, the client machine 110 may implement a patch upload process where successive patches 126 are repeatedly uploaded 127 to the machine assessment service (at subsequent times 1, 2, 3). At each patch cycle (time t), a current baseline 122 is generated by a baseline generation component 116. In some embodiments, the current baseline 122 may be generated by making a copy of the machine characteristics data 112 in its current state. For example, in embodiments where the machine characteristics data is a file or a set of files, a copy of the file or set of files may be created as the current baseline. In some embodiments, the baseline generator 116 may perform certain modifications to the machine characteristics data 112 to generate the baseline 122. For example, in some embodiments, baseline generator 116 may filter out certain data elements that are not needed for machine assessments so they are not included in the baseline 122.

In some embodiments, the baseline 122 may be generated in a different format from the actual machine characteristics data 112. For example, the machine characteristics data 112 may be stored natively in a binary encoding format, and the baseline 122 may be generated in a text encoding format that encodes individual text characters in a defined character set. Examples of character encoding formats include ASCII, various types of Unicode encoding formats such as UTF-8, UTF-16, UTF-32, and the like. A binary encoding format, on the other hand, does not encode data to represent individual characters in a defined character set. In some embodiments, the machine characteristics data 112 may be a WINDOWS registry hive, which is stored in a binary hive format, and the baseline 122 may be a text file stored in the .reg file format. In some embodiments, the .reg file may be generated using the reg.exe tool (or the corresponding WINDOWS library) provided by the WINDOWS operating system to export contents of the registry hive into the .reg file format.

As shown, the current baseline 122 may then be provided to a patch generation component 124, along with a previous baseline 118 generated at a previous time (e.g. time t−1). The current baseline 122 and the previous baseline 118 may be stored in the same format. In some embodiments, the previous baseline 118 is the current baseline of the last patch cycle. The patch generator 124 may then perform a comparison of the two baselines 118 and 122 to generate the patch 126. Accordingly, the generated patch 126 will indicate relevant differences (i.e. the changes) between the previous state and the current state of the machine characteristics data.

In some embodiments, the patch generator 124 may use a textual difference algorithm to compare the two baselines 118 and 122. The textual difference algorithm may be line-based or byte-based. A line-based textual difference algorithm may be used when the baselines are represented as texts that delimit lines using a delimiter character such as CR, LF, or CRLF. The output of a line-based textual difference algorithm may indicate differences in respective lines of two text files. An example of a line-based difference algorithm is implemented by GNU diff. On the other hand, a byte-based textual difference algorithm does not take into account the lines in the text files, and will output differences in respective bytes or byte groups in the two text files. In some embodiments, the byte-based textual difference algorithm may be used to compare two binary encoded files.

In some embodiments, the difference algorithm may compare two text baselines but output the difference results in a binary encoding format, instead of a text encoding format. Patches generated in binary encoding format are more compact, and in some embodiments, binary encode patches are can be applied more easily to the snapshot 142 maintained at the machine assessment service 130.

In some embodiments, the baselines 118 and 122 are .reg files generated from a registry hive, and the patch generator 124 may be a line-based textual difference generator. The resulting patch 126 generated by the line-based textual difference generator may be another .reg file. In some embodiments, the patch generator 124 may be configured to apply a set of filtering or transformation rules during the patch generation process. Filtering rules may be used to exclude certain elements of the registry data that are not relevant to machine assessments. For example, machine characteristics data that are highly volatile (i.e. frequently-changing) may be filtered out. As another example, random seeds used by WINDOWS components may be filtered out. As yet another example, certain WINDOWS performance or debugging data such as PerfLib metrics are also filtered out. In some embodiments, the patch generator 124 may implement semantic filtering according specified logic, for example, to exclude certain subkeys of the registry when a parent key has a particular value, etc. In some embodiments, these filtering rules may be configurable by a user for different categories of data, via a configuration interface such as a graphical user interface (GUI) or a configuration file.

In some embodiments, the generated patch 126 may include a set of patch instructions, that indicate how to apply the changes in the patch to recreate the state of the current baseline in the snapshot. In some embodiments, the patch instructions may be stored or uploaded separately from the patch 126 itself, and may be stored in either text or binary format. For example, in some embodiments, the patch 126 may indicate a number of changes to a set (e.g. a directory) of files, and the patch instructions may indicate a respective operation for each file in the set, including to copy over the file form the last snapshot (e.g., no change to file), copy the file from the patch (e.g., new file or substantial change in file), remove an existing file from the last snapshot, or apply a per-file patch to an individual file.

As shown, after the patch 126 is generated, it is uploaded 127 to the machine assessment service 130, which then applies 155 the patch to the snapshot 142 via a patch application module 150. As with the initial upload 114, the patch may be transmitted over a trusted TLS session, and may be compressed using a data compression technique. In some embodiments, if no difference is detected between two baselines 118 and 122, the client machine may not upload any patches. In some embodiments, even if there are no detected differences between the two baselines, the client machine may still send a message to the machine assessment service, indicating that no patching is needed. In some embodiments, as shown, at the end of each patch cycle, the client machine will replace 129 the previous baseline 118 with the current baseline 122, so that the current baseline is used as the previous baseline in the next patch cycle.

In some embodiments, the patch applicator 150 at the machine assessment service will apply the received patch to update the data snapshot 142 of the machine characteristics data 112 to update the snapshot to the current state of the machine characteristics data 112. In some embodiments, an application of a new patch to the snapshot 142 may trigger a new assessment of the client machine by the machine assessment component 160.

In some embodiments, the patch applicator 150 may be responsible for applying patches for a large number of different delta collection processes, for different client machines, or even different entities. Accordingly, in some embodiments, the patch applicator 150 may be implemented as an independent service within the machine assessment service 130. The patch application service may maintain a pool of compute nodes that repeatedly retrieve patch application jobs from a queue of pending patches, and apply the patches to their corresponding snapshots. In some embodiments, if a problem arises with a patch application (e.g. a detected validation error), the patch applicator 150 may instruct the client machine 110 to resend the patch 126 or simply upload the full copy of the current baseline.

In some embodiments, if there are no problems encountered with any of the patches, the delta collection process with continue to generate and upload successive patches in the above fashion, to keep the snapshot 142 at the machine assessment service synchronized with the current state of the machine characteristics data 112. A new patch cycle may be initiated based on a set schedule, or be triggered based on a system event at the client machine, or a request from a user or the machine assessment service.

Figure 2:
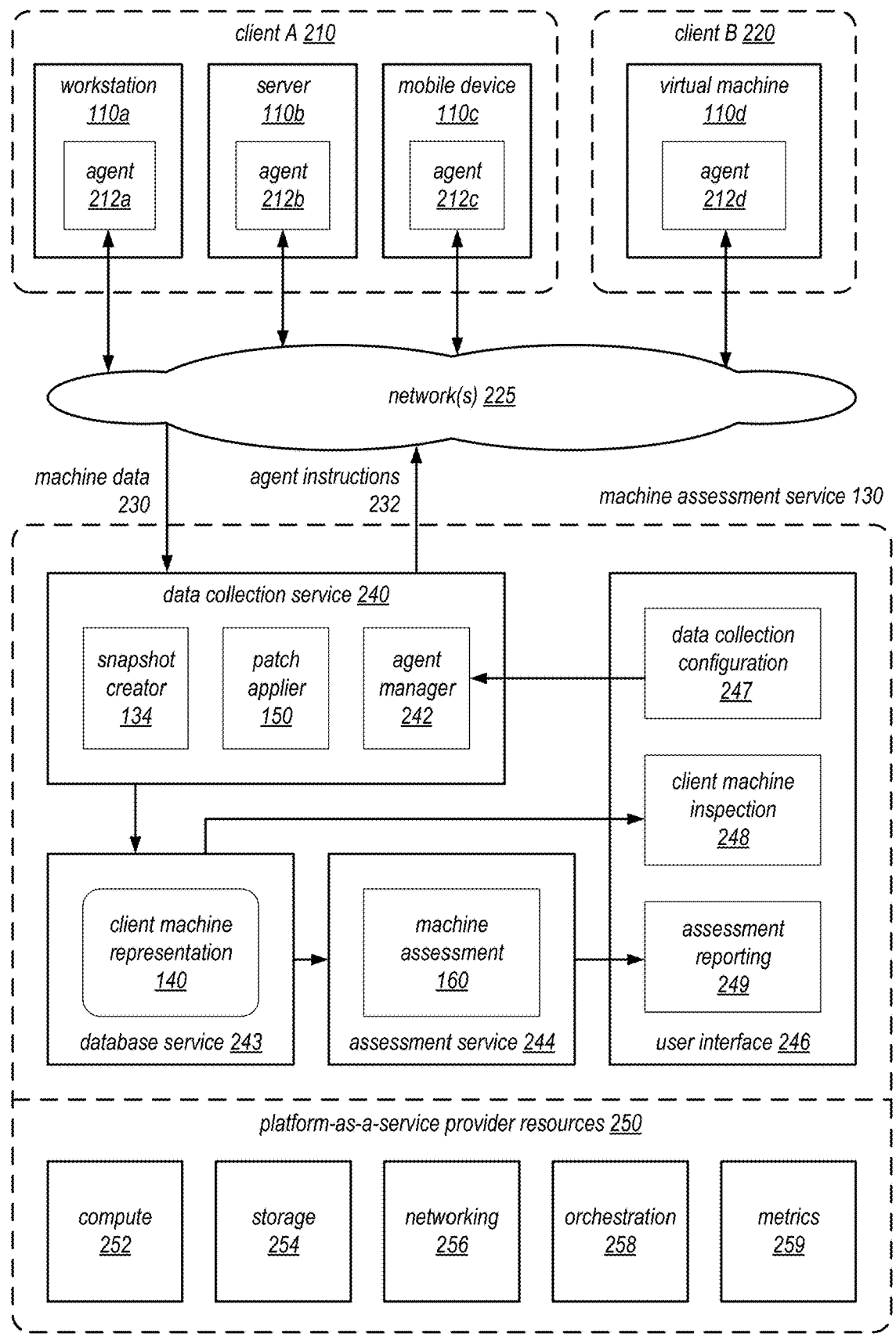
FIG. 2 is a block diagram illustrating a machine assessment service that is implemented in a platform-as-a-service provider network, according to some embodiments.

FIG. 2 is a block diagram illustrating a machine assessment service that is implemented in a platform-as-a-service (PaaS) provider network, according to some embodiments.

As shown, the machine assessment service 230 may be configured to interact with various agents executing on different clients 210 and 220. The different clients may be different groups, organizations, companies, or other types of entities. In some embodiments, distinct clients 210 and 220 may be associated with a different user account of the machine assessment service 130. As shown, the clients in this example may own different types of computing resources, such as a workstation 110*a*, a server 110*b*, a mobile device 110*c*, and a virtual machine 110*d*. Each these types of machines may be an embodiment of the client machine 110 of FIG. 1. The virtual machine 110*d* may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, client machines 110 may include other types of computing systems, including embedded systems, networking devices, storage devices, Internet-of-Things (IoT) devices, vehicles, and the like.

As shown, each of these types of machines or execution environments may be monitored by agents 212*a*-*d* that collect machine characteristic data from the machines or execution environments. In some embodiments, the agents 212 may be implemented as a lightweight software module on the client machines 110. Different types of agents 212 may be implemented for different machine platforms, such as WINDOWS, LINUX, or MAC machines. In some embodiments, the agent 212 may be designed to run on a different computing system from the machine 110 being monitored. In that case, the agent 212 may be configured to establish network connections to the machine 110 and collect machine characteristics data over these network connections. In some embodiments, the baseline generator 116 and patch generator 124 of FIG. 1 may be implemented by the agents 212.

As shown, the agents 212 are configured to communicate with the machine assessment service 130 over one or more networks 225. In various embodiments, the network(s) 225 may encompass any suitable combination of networking hardware and protocols necessary to establish communications between the agent 212 and the machine assessment service 130. In some embodiments, the machine 110 may execute in a private network of a company, behind a company firewall, and the network 225 may include a public network such as the Internet, which lies outside the firewall. The network 225 may encompass the different telecommunications networks and service providers that collectively implement the Internet. In some embodiments, the network 225 may also include private networks such as private local area networks (LANs), private wide area networks (WANs), or private wireless networks. The network 225 may be implemented using different hardware (e.g., modems, routers, switches, load balancers, proxy servers, etc.) and software (e.g., protocol stacks, accounting software, firewall/security software, etc.) for establishing networking links between the client machines 110 and the machine assessment service 130.

As shown, the machine assessment service may include a number of services implemented on of the resources 250 provided by the PaaS provider. In this example, the snapshot creator 134 and patch applier 150 are implemented by a data collection service 240, which may implement the service-side finality of the delta collection process. The data collection service 240 may be configured to receive machine data 230 from the delta collection process, including initial uploads 114 and patch uploads 127 from the client machines 110. Additionally, the data collection service 240 in this example also implements an agent manager component 242, which is tasked with sending agent instructions 232 to the agents. The agent instructions may cause the agents 212 to upload patches or full copies of the machine data, adjust their collection scopes, or perform other tasks on the client machines.

As shown, the virtual representation 140 of the client machine may be hosted in a database service 243. In some embodiments, the machine assessment service 130 may provide the database service to store the different snapshots being maintained by the delta collection processes. The database service 243 may be implemented on top of storage resources 254 provided by the PaaS provider. For example, the PaaS provider my provide storage in the form of a database, a file system, or a volume hosted in the cloud. In some embodiments, the storage provided by the machine assessment service 130 may be persistent storage. In some embodiments, the provided storage may not be guaranteed to be persistent, so that if the service is restarted, some of data may be lost. In some embodiments, the database service 243 may be enhanced using a high-performance in-memory cache, which may be provided by the PaaS provider as a managed cluster of compute nodes, such as a REDIS cluster.

As shown, the machine assessment component 160 may be implemented by an assessment service 244. The assessment process may be conducted by an assessment orchestrator, which may invoke various types of assessments on the virtual representation 140 of the client machine. In some embodiments, the assessments may determine various security vulnerabilities of the client machine based on the collected machine characteristics. For example, an assessment may detect conditions such as the existence of malware signatures, missing application patches, incorrect or suspicious file permissions or locations, users with inappropriate access privileges, among other things. In some embodiments, the assessment module 160 may observe and track these conditions over time, to determine a problematic or suspicious pattern of changes on the remote machine. The assessment service 244 may then generate an assessment report that details any detected security vulnerabilities about the machine, which may be provided the machine's owners via a user interface 246.

As shown, the machine assessment service 130 may also implement a user interface 246, which may be a web-based graphical or command line user interface. In this example, the user interface 246 provides a data collection configuration interface 247, a client machine inspection interface 248, and an assessment reporting interface 249. The data collection configuration interface 247 may be used to configure various aspects of the delta collection process, includes the scope of collection, various data filtering or transformation rules, the scheduling of data collections or trigger conditions for data collections, among other parameters. The client machine inspection interface 248 may be used to examiner the current state of the client machine, as reflected by the virtual representation 140 of the machine. For example, the client machine inspection interface 248 may allow users to navigate through the client machine's configurations and files, or issue queries against the configuration settings of the client machine. The assessment reporting interface 249 may be used to provide results of machine assessments to users. In some embodiments, the assessment reporting interface 249 may include a notification interface that pushes notifications to registered users, for example, via email or text, or to a client-side repository.

As shown, the machine assessment service 130 may be implemented within a platform-as-a-service provider network, and the agents 120 and other clients of the machine assessment service 130 may convey services requests to and receive responses from PaaS provider network via network 225. In some embodiments, the service request and responses may be web services requests and responses and formatted as JSON documents. The machine assessment service 130 may support REST-style or document-based (e.g., SOAP-based) types of web services requests. In some embodiments, the machine assessment service 130 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 250, which can be leased by service customers to implement custom hosted services. As shown, the PaaS provider may provide resource services such as compute resource service 252, storage resource service 254, networking resources service 256, orchestration service 258, and resource metrics service 259. The services of the machine assessment service 130 may be built using these underlying resource services provided by the PaaS provider. In some embodiments, the PaaS resources 250 may implement features such as load balancing of incoming service requests and/or dynamic management and scaling of service node pools. In some embodiments, each of the services 240, 243, 244, and 246 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 3:
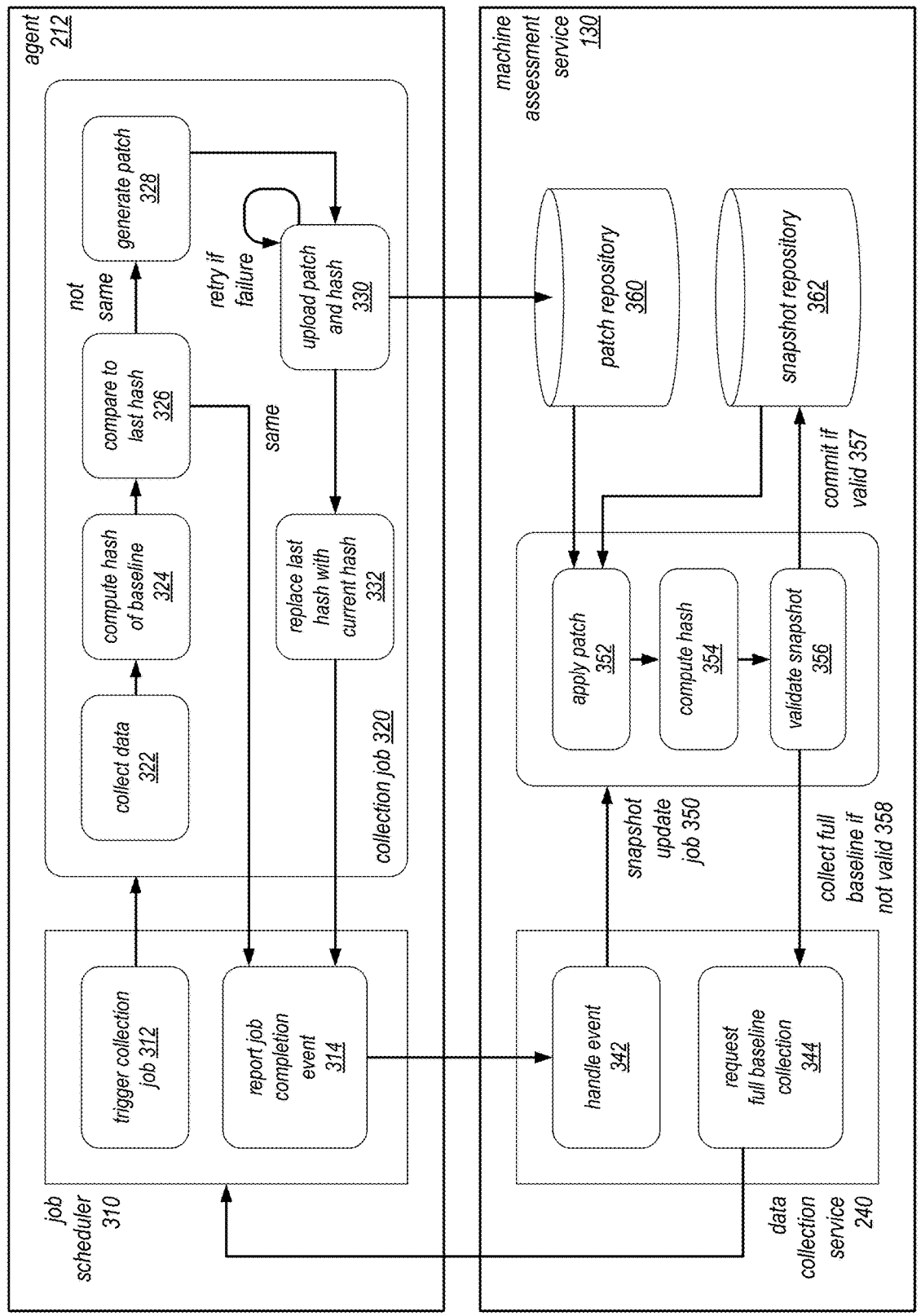
FIG. 3 illustrates an agent and a machine assessment service that implement a snapshot validation mechanism used in a delta data collection process, according to some embodiments.

FIG. 3 illustrates an agent and a machine assessment service that implement a snapshot validation mechanism used in a delta data collection process, according to some embodiments.

As shown, in this example, the agent 212 on a client machine implements a job scheduler 130 configured to schedule or initiate collection jobs 320 on the client machine. The collection job 320 may be triggered by a triggering operation 312, which may occur as a result of a specified data collection schedule (e.g. once a day), an event on the client machine (e.g. a change in the machine characteristics data or a machine crash), or an explicit request from a user or the machine assessment service 130. In some embodiments, the job scheduler or event handler 130 may be implemented as a background process running on the client machine, and each collection job 320 may be a separate thread or process.

As shown, the collection job 320 will carry out a number of operations or steps. At operation 322, machine characteristics data is collected. The data collection may simply make a copy of the machine characteristics data, or in some embodiments, the data collection may generate a baseline of the machine characteristics data, possibly in a different encoding format, as discussed in connection with FIG. 1.

At operation 324, a hash value is computed for the collected data or baseline by applying one or more hash functions to the contents of the collected data or baseline. The hash value may be computed so that baselines with identical contents will produce the same hash value, and baselines with different contents will produce different hash values with a high probability. In some embodiments, a checksum or some other type of check value may be generated instead of a hash value.

At operation 326, the generated hash value is compared against a last hash value computed from a last baseline (e.g. the previous baseline 118 of FIG. 1). As shown, if the two hash or checksum values are the same, the collection job 320 terminates and reports to the job scheduler 310 that no patch is needed. As a result, the job schedule may report 314 a job completion event to the machine assessment service 130, indicating that no patch was uploaded during that data collection cycle. On the other hand, if the two hash or checksum values are not the same, the collection job 320 will proceed to operation 328 to generate the patch. The patch may be generated using a component such as the patch generator 124 and in a manner as discussed in connection with FIG. 1.

After the patch is generated, at operation 330, the patch and the hash or checksum value are uploaded to the machine assessment service 130. As shown, the uploaded patch may be stored in a patch repository 360 of the machine assessment service. The uploading of the patch may be performed by a component in the data upload interface 128 of FIG. 1, which may be configured to encrypt and/or compress the patch before it is uploaded. In some embodiments, the collection job 320 may be configured to repeatedly retry the upload if the upload is not successful.

As shown, the hash or checksum value computed by the agent 212 will be used by the machine assessment service 130 to validate the snapshot after the patch is applied. In some embodiments, the hash or checksum value may not be uploaded with the patch, but rather, reported as part of the job completion event 314. In some embodiments, the job completion event may be reported via one service interface of the machine assessment service, and the patch itself may be uploaded via another service interface of the machine assessment service.

In some embodiments, if a patch is generated, the job completion event will include both the hash or checksum value for the current baseline and the last hash or checksum value for the last baseline. The job completion event may also indicate a storage location or address where the patch was uploaded to, or a patch identifier that can be used to infer the storage location or address. In this manner, the machine assessment system 130 can use this information in the job completion event to generate snapshot update jobs 350 to retrieve the correct patch.

As shown, after the patch upload, the collection job will replace 332 the last hash or checksum value of the last baseline with the hash or checksum value computed during the current collection job. In this manner, the current hash or checksum value will become the last hash or checksum value for the next collection job. This replacement of the hash or checksum value may be performed along with the replacement 129 of the previous baseline, as discussed in connection with FIG. 1.

As shown, when the job completion event is received by the machine assessment service 130, the event may be transmitted to the data collection service 240 and handled 342 by an event handler implemented by the data collection service 240. In some embodiments, the data collection service 240 may be configured to handle collection job completion events from a large number of agents.

To handle the job completion event reported by the agent, the data collection service 240 may initiate a snapshot update job 350. As shown, the snapshot update job will retrieve the correct patch that was uploaded from the patch repository 360. The retrieval may be performed based on the reference to the patch (e.g. a patch ID) indicated in the job completion event. Next, the snapshot update job retrieves or identifies the correct snapshot from a snapshot repository 362 maintained by the machine assessment service, and applies the patch to the snapshot. The application of the snapshot may be performed by a component such as the patch applier 150, and in the manner discussed in connection with FIG. 1. In some embodiments, the patch may be applied on the copy of the snapshot in the virtual representation of the client machine. However, the snapshot will be marked unavailable for use during the patching process.

After the patch has been applied to the snapshot, at operation 356, a service-side hash or checksum value is computed from the resulting snapshot in the same manner that the hash or checksum value was computed by the agent 212. In some embodiments, in order to compute the service-side hash or checksum value from the snapshot, the snapshot may first be converted to a different encoding format. For example, in embodiments where the baselines are generated at the agent in a different encoding format from the actual collected data (e.g. a reg file baseline generated from a binary registry hive), the hash or checksum values at both the agent and the machine assessment service may be computed from the data in the different encoding format.

After the service-side hash or checksum value is generated, the snapshot update job 350 then validates 356 the snapshot by comparing the service-side value against the value received from the agent. If the two are a match, this indicates that the contents of the snapshot matches the state of the machine characteristics data reported by the agent, and the patch is committed 357. In some embodiments, committing the patch may include opening the snapshot to the various assessment processes of the machine assessments service 130, or trigger a new assessment of the client machine. However, if the two hash or checksum values do not match, the snapshot update job 350 may indicate to the data collection service 240 that the snapshot is not valid, and instruct 358 the data collection service to collect the full current baseline of the data from the agent 212. While the full baseline is a relatively large upload, it should happen only rarely, when synchronization is lost between the machine assessment service and the agent. For most changes in the client machine data, only the small patch will be needed to synchronize the snapshot with the data.

As shown, the collection of the full baseline may be conveyed to the agent via the request operation 344, which may be issued by the agent manager 242 as discussed in connection with FIG. 2. The instruction may be received by the job scheduler/event handler 310 of the agent, which will cause the agent to initiate another collection job to upload the full baseline.

FIG. 4 illustrates an example file upload event generated by an agent that implements a delta data collection process, according to some embodiments. In this example, the file upload event is represented in JSON format. The depicted file upload event may be an example of the job completion event discussed in connection with FIG. 3.

As shown, the file upload event 410 indicates a number of metadata elements to the machine assessment service. The uploaded patch section 420 indicates metadata for the uploaded patch, which may have been uploaded separately from the event 410, via a different service interface of the machine assessment service. In this example, section 420 indicates an object key, which identifies the name of the patch uploaded to a storage service provided by the machine assessment service. As shown, the patch was uploaded as a zip file. Section 420 also indicates a bucket, which may identify a storage location of the patch within the storage service. In some embodiments, the storage service may be the S3 service provided by AMAZON WEB SERVICES.

As shown, section 420 also indicates an object hash, which may be a hash or checksum value computed from the current baseline generated at the agent, as discussed in connection with FIG. 3. In some embodiments, this value may be a hash value produced by the MD5 hashing algorithm. In this example, the section 420 also indicates the size of the uploaded patch, which may be used validate the upload or control how the snapshot update is carried out.

As shown, the previous patch section 430 indicates a number of metadata elements that describe the previous patch that was uploaded by the agent in the last patch upload cycle. In some embodiments, this information may be used to verify that the current patch is in an expected sequential order of patches received by the machine assessment service. If the indicated previous patch is not as expected, this may indicate that a patch was lost or a cloning or reversion of the client machine has occurred. In some embodiments, these conditions may cause the machine assessment service to instruction the agent to upload the full baseline of the client machine data.

As shown, the patch content section 440 indicates a number of patch operations. In some embodiments, the collect event may include operations or instructions that instructs the machine assessment service on how to perform the patch application. In this example, these instructions are indicated in the JSON document. In some embodiments, these instructions may be represented in a binary format or a format that is natively executable by the machine assessment service.

As shown, the uploaded patch is used to patch a snapshot of a set of files (e.g. certain files for an application appZ). The set of files may include a set of collected information about the application, which may be generated by the application itself or generated by other tools specifically for assessment purposes. In some embodiments, the collected files may include output obtained generally for the asset machine. For example, the collected file set may include an "installed software" output for the asset generated by a package manager on the asset. As another example, the collected files may include a file indicating a list of active kernel modules on a LINUX system obtained via the "lsmod" command, or the kernel version of a UNIX system obtained via the "uname" command. As another example, the files may include the output of a "find/-perm" command, which may be used to search a file system hierarchy for files having a particular set of permissions that represent permission/ownership policies for the particular asset or client. As may be appreciated by those skilled in the art, depending on the embodiment, the collected files may include asset information generated using a variety of different tools and in different manners.

As shown in this example, the instructions indicate operations that should be performed for each file in the set to apply the patch. For example, operation 442 indicates to copy the file config.txt from the patch to the next version of the snapshot (e.g., the uploaded patch zip file includes a full copy of the file config.txt). This operation may be performed for files that are new to the snapshot or have been changed extensively. Operation 444 indicates to copy the file component_list from the last version of the snapshot to the next version of the snapshot. This type of operation may be performed for files that have not changed from the last patch. Operation 446 indicates to remove the file temp_data from last version of the snapshot so that it is not present in the next version of the snapshot. This operation may be used when files are deleted from the set of files during successive snapshots. Operation 448 indicates to apply a change from the patch to file exec_log. For example, the uploaded patch may include an individual patch file indicating changes for the file exec_log. This type of operation may be used to update the contents of any files that have changed since the last patch. Operation 448 in this example also indicates a target hash value, which is specific to the file exec_log. This hash value may be used to verify or validate the resulting state of the file after applying the patch. In some embodiments, individual files may be validated separately, so that a validation error on a particular file only requires that one file to be uploaded.

As will be appreciated by those skill in the art, many different types of patch instructions may be implemented to perform a wide variety of tasks during the patch application process, in addition to those shown here. As just some examples, patch instructions may be used to delete files, change file permissions, decompress files, combine files, update databases, update configuration settings, among other types of operations.

Figure 5:
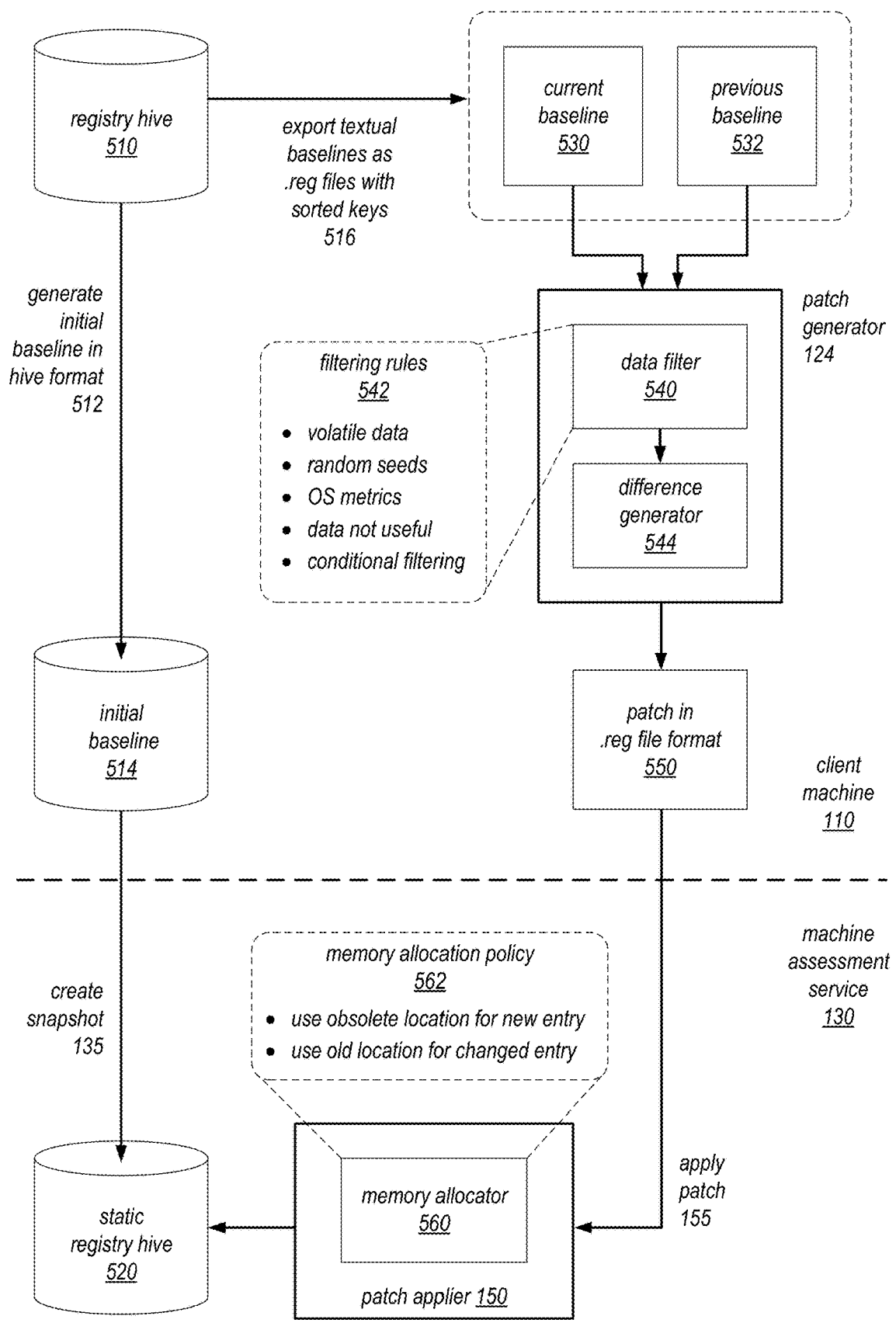
FIG. 5 illustrates a process of generating and applying a patch for a WINDOWS registry in a delta data collection process, according to some embodiments.

FIG. 5 illustrates a process of generating and applying a patch for a WINDOWS registry in a delta data collection process, according to some embodiments. In this example, the registry hive 510 may be the machine characteristics data 112 of FIG. 1, and the static registry hive 520 may be the data snapshot 142*a* of FIG. 1.

In this example, the registry hive 510 is WINDOWS registry hive blob or file, which includes machine characteristics data about a client machine including the hardware, software, and user information about the client machine. The registry hive 510 is stored in a binary encoding format. To initialize the delta collection process for the hive 510, an initial baseline 514 of the hive is generated 512 in hive format. In some embodiments, the initial baseline 514 may be generated by exporting the hive 510 in binary format using the WINDOWS reg.exe utility or the underlying WINDOWS library.

As shown, the initial baseline 514 is uploaded to the machine assessment service 130 to create 135 the snapshot of the hive, which is maintained as a static registry hive 520 in binary hive format. The snapshot hive 520 is static in the sense that it is not used as a live registry for a client machine. Static registry hives cannot be updated using the native registry utilities provided by WINDOWS.

Along with the generation of the initial baseline 514 in hive format, the client machine will also generate an initial textual baseline of the registry hive 510 in text encoding format. This initial textual baseline may be generated by exporting the hive 510 in text format using the WINDOWS reg.exe utility or the underlying WINDOWS library. The initial textual baseline may be a .reg file, which is in a text encoding format that encodes data as text characters. The .reg file may be a line-formatted file that formats the registry data as key-value pairs on individual lines. Some of the entries in the file may be key with no associated values. Moreover, the .reg file will be generated so that the key-value pairs are sorted in a deterministic order, for example, in an alphanumeric order of the keys. This initial .reg file will compared to the next textual baseline to generate the first delta patch for the snapshot 520.

After the initialization process, patches 550 will be generated at successive times by comparing a current textual baseline 530 to a previous textual baseline 532. The subsequent textual baselines will all be generated in the same manner as the initial textual baseline. That is, these textual baselines are exported 516 as .reg files with data elements sorted in the deterministic order (e.g. sorted keys). The two .reg files are then provided to the patch generator 124, where they compared to generate the patch 550.

The depicted process uses textual baselines to generate patches for a number of reasons. First, the .reg files can be more easily compared than the binary hive baselines. Hive baselines are encoded in a closed binary format, and clients of WINDOWS clients have no control over how data is represented in the hive. The same data content may be organized in different ways in the hive, so that a byte-for-byte diff of two versions of the hive will produce a large number of differences that are not semantic meaningful. In contrast, the .reg file represents the data in a normalized form, and they that can be easily compared using a textual diff to produce semantically meaningful differences. Moreover, using the .reg file format allows the patch generator to implement custom filtering of registry data (e.g. using the data filer component 540). As another benefit, .reg file format is a human-readable format and permits manual inspection of the generated baselines and the resulting patch.

As shown, the two textual baselines 530 and 532 are provided to the patch generator 124 to generate the patch 550, which is also in the .reg file format. The patch generator 124 may implement a data filter component 540 to filter out certain types of registry data from the diffing process, so that they are not included in the patch 550. The filtering may be controlled by a set of filtering rules 542, which may be implemented by the filtering component 540 or configurable by a user. Such configuration may be provided by a configuration interface, for example, a user interface such as a GUI, a programmatic interface such as an API, a configuration file or database, or the like. Depending on the embodiment or configuration, registry data that are filtered out may include data that is highly volatile (e.g. changes on a frequent basis), random seeds used by WINDOWS components, certain operating system metrics (e.g. PerfLib performance or debugging metrics), and other types of registry data that are not needed or useful to the machine assessment service. In some embodiments, the filtering rules 542 may be expressed using filtering logic. For example, the filtering rules 542 may include conditional filtering, where certain keys are excluded based on the values of certain other keys. As another example, some filtering rules may be conditional on external states (e.g., the state of the client machine, the time of day, etc.).

After the filtering, the resulting contents of the textual baselines are provided to a difference generator 544 to generate the patch. In some embodiments, the difference generator 544 is a line-based textual comparator, which produces its output as line differences. The output of the difference generator 544 may be another .reg file, which can be directly applied 155 to the static registry hive 520 by the machine assessment service.

As shown, the patch applier 150 in this example is a specialized hive writer that can apply .reg files to the static registry hive 520. Because the utilities provided by WINDOWS only permits merging of .reg files to active registry hives, a third-party tool is needed to apply the patches in this context. In some embodiments, a modified version of a third-party tool such as HIVEX may be used to perform the patch application 155.

As shown, in this example, the patch applier 150 is enhanced with a custom memory allocator 560. The memory allocator 560 is used in some embodiments to improve memory allocation when the .reg patch file is merged to the static registry hive 520. The hive binary format stores entries in pages. In some embodiments, the memory allocator 560 implements a custom memory allocation policy 560, which causes the hive writer to reuse old or obsolete memory locations when adding or changing entries in the static hive. For example, when a new entry is added to the static hive, the memory allocator 560 will attempt to assign the new entry to an allocated location that is now obsolete. When an entry is changed in the static hive, the memory allocator will attempt to reuse the old memory location of the entry. To allocate memory for new entries, the memory allocator may search for a memory location of sufficient size using a first-fit or best-fit algorithm. With this memory allocation policy 562, the hive writer can essentially defragment the data in the hive pages as it writes the static hive, thereby limiting the size of the hive binary, even after many updates.

Figure 6:
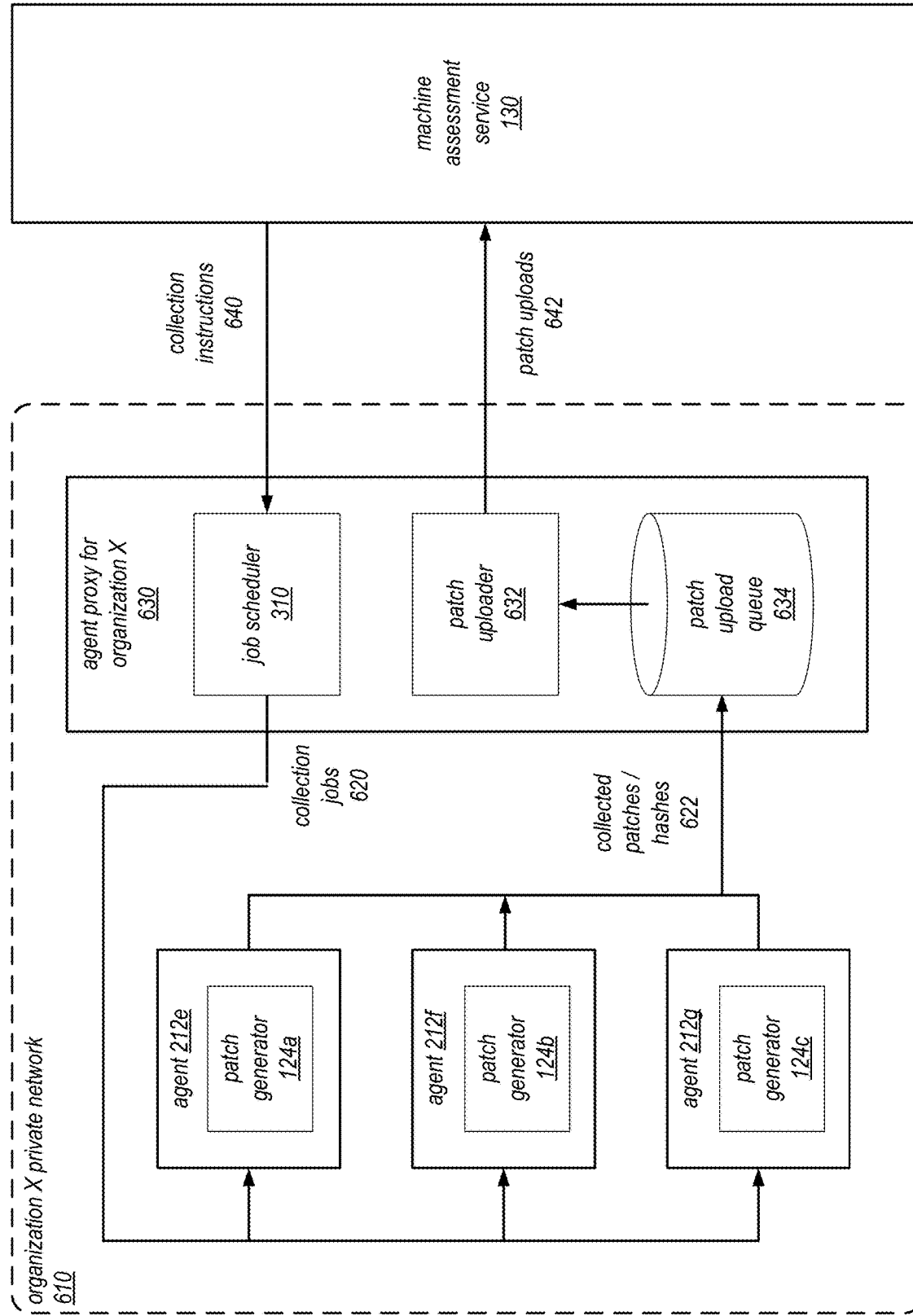
FIG. 6 illustrates an example agent proxy that triggers delta data collection jobs at the agents and uploads patches to the machine assessment service, according to some embodiments.

FIG. 6 illustrates an example agent proxy that triggers delta data collection jobs at the agents and uploads patches to the machine assessment service, according to some embodiments.

As shown in this example, an agent proxy 630 is implemented for an organization X, which is executing inside organization X's private network 610 (e.g., behind organization X's network firewalls). In some embodiments, the agent proxy 630 may be implemented on a designated gateway server within company's private network. In some embodiments, the agent proxy 630 may be implemented elsewhere, for example, at a location of the machine assessment service 130 (e.g. on the PaaS platform as discussed in connection with FIG. 2), or in a third-party or public network.

As shown in this example, the agent proxy 630 implements the job scheduler 310 of FIG. 3. The agent proxy 630 is configured to receive data collection instructions 640 from the machine assessment service 130, and in response, initiate collection jobs 620 to the agents 212e-g or update a global job schedule for the agents. As shown, the job scheduler 310 is configured to send collection jobs 620 to individual agents 212 operating in the private network 610.

As shown, the agents 212e-g each implements a patch generator 124, as discussed in connection with FIG. 1. These agents may generate patches in response to the collection jobs 620 indicated by the job scheduler 310, and send the collected patches and associated hash or checksum values back to the agent proxy 630. The agent proxy may store these patches and associated hash or checksum values in a patch upload queue 634, and upload 642 such data via a patch uploader component 632. In this manner, the agents and their respective client machines are freed from having to manage the upload process or interface with machine assessment service directly. Instead, the patch uploader 632 is configured to manage the patch uploading process, including the maintenance of secure communication channel(s), encryption and/or compression of data, and upload retries in the event of failure, etc. In some embodiments, the patch uploader 632 may also report the job completion events as discussed in connection with FIG. 3. In other embodiments, the job completion events may be reported by the agents 212 themselves.

Figure 7:
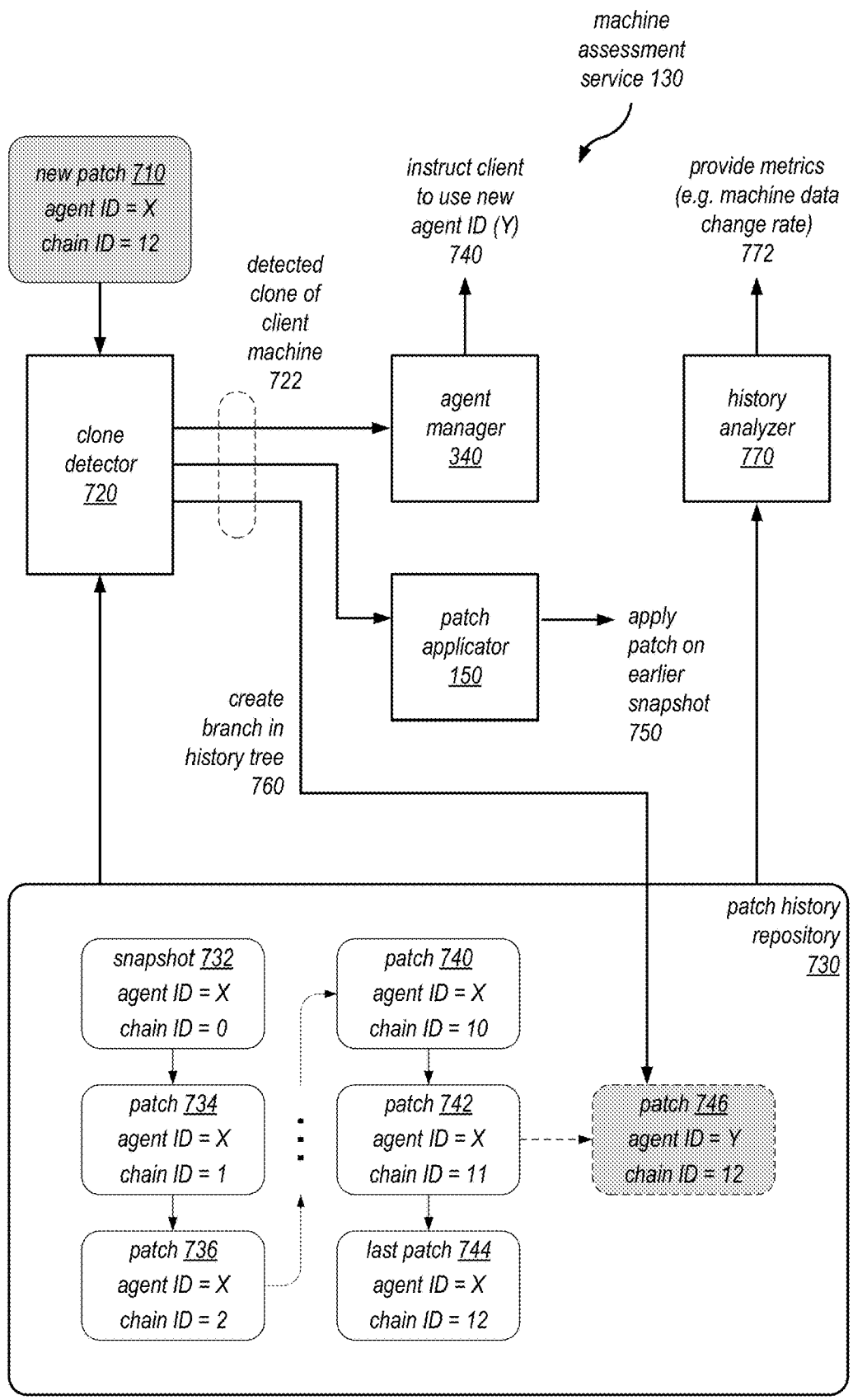
FIG. 7 illustrates a technique to detect the cloning of a client machine based on received patches in a delta data collection process, according to some embodiments.

FIG. 7 illustrates a technique to detect the cloning of a client machine based on received patches in a delta data collection process, according to some embodiments.

As shown, the figure depicts a number of components in an embodiment of the machine assessment service 130, including the agent manager 340 of FIG. 3 and the patch applicator 150 of FIG. 1. Additionally, the machine assessment service in this example implements a patch history repository 730, which stores metadata that indicates the history of the patches received for a particular client machine data snapshot 732. The patches in the history are stored in sequence according to the order in which they were applied to the original snapshot 732, forming a patch chain. Each patch in the chain is assigned a chain ID that identifies the patch's place in the patch chain sequence. For example, patch 740 has a chain ID of 10, and the next patch 742 in the sequence has a chain ID of 11.

In some embodiments, the patch history may be used by the machine assessment system to determine when a client machine has been cloned or reverted back to a previous state. Cloning may occur with virtual machines, for example, when a new virtual machine is created from a virtual machine image associated with a current virtual machine. Reversion may occur when an existing virtual machine is reverted back to a previous image of itself. In such situations, the virtual machine may start from a data state that have already been seen by the machine assessment service 130. Thus, in some embodiments, the machine assessment service may reject patches from the cloned or reverted machine, because they appear to be out-of-sync with the current state of the service-side snapshot (for example, based on a hash or checksum mismatch).

To deal with such cloning or reversion events, in some embodiments, the machine assessment service may implement a clone detector 720 to detect such events. The machine assessment service may maintain with the client machine a synchronized view of the next chain ID for the next patch. In some embodiments, the next chain ID may be provided by the machine assessment service to the agent, for example, as part of an acknowledgment of the last patch. In some embodiments, the agent and the machine assessment service may independently generate the next chain ID, for example, by incrementing its current chain ID. The agent may include its version of the chain ID with each patch. The machine assessment service (e.g. the clone detector 720) will compare this chain ID value with its expected value of the chain ID to determine if the two are the same. If the chain ID value provided by the agent is smaller or earlier than the service's expected value, a cloning or reversion of the client machine has been detected.

In the illustrated example, a new patch 710 is received from an agent on a client machine. The new patch indicates an agent ID X, which will be the same for a cloned or reverted client machine. The new patch additionally indicates that the new patch 710 is associated with a chain ID of 12. However, as shown, the machine assessment service has already seen a patch with chain ID 12 (last patch 744). Thus, the service is expecting a next chain ID value of 13. Based on this information, a clone detector 720 can detect 722 that the new patch was sent from a clone of the client machine that sent the last patch 744. As another possibility, the clone detector 720 may determine that the client machine has reverted back to a previous state, before it sent the last patch 744.

Responsive to this detection 722, the machine assessment service 130 may take a number of actions. First, the patch applicator 150 may apply 750 the new patch 710 to an earlier snapshot of the client machine, which may be maintained or reconstructed by the machine assessment service. In this case, the new patch will be applied to a state of the snapshot after patch 742 (chain ID 11), to create the new snapshot for the cloned client machine. Advantageously, even though the new patch 710 may indicate an out-of-sync condition based on its check value, the service is able recognize that the patch can be applied to a previous state of the snapshot, without having to collect a full baseline from the client machine.

Second, a detection of a client machine clone may cause the agent manager 340 to send an instruction 740 or message to the agent on the cloned or revered client machine to generate a new agent ID. In some embodiments, the agent manager 340 may generate the new agent ID and provide that to the agent in the instruction. The instruction or message will cause the agent to use the new agent ID (here agent ID Y) to report subsequent patches.

Third, the detection of the cloning or revision of a client machine may cause a branch to be created 760 in the patch history 730 of the snapshot 732. As shown in this example, the new patch is stored as patch 746 in the patch history repository as the next patch to patch 742. However, the agent ID of patch 746 is changed to Y. Accordingly, the patch history 730 is branched or forked to form a tree or directed graph of patches. Subsequent patches from the original client machine (with agent X) will be appended to the last patch 744 in the history graph, and subsequent patches from the clone (with agent Y) will be appended to the last patch for that machine (patch 746) in the history graph. In some embodiments, when a new patch from a client machine cannot be validated with respect to the current snapshot state of the client machine maintained by the machine assessment service, the service may check the patch history 730 to see if the patch is valid with respect to any former snapshot states of the machine indicated by the patch history. If so, this may indicate that the client machine has been cloned or has reverted back to the former snapshot state. When this occurs, the machine assessment service may simply create a branch point from the former snapshot state by applying the new patch to that state, without requesting a full baseline to be collected from the client machine. Subsequent patches received from the client machine will be applied to the new branch to create further snapshot states for that machine.

As shown, the patch history maintained by the machine assessment service may be analyzed by a patch history analyzer 770 to obtain certain metrics 772 about the client machine (and any clones). For example, the patch history may be analyzed to determine how often patches are generated by the client machine, which indicates a frequency of change of the machine characteristics data being collected from the client machine. As another example, the patch history data may be analyzed to determine how often full baselines are collected from the client machine (as opposed to just patches), which indicates a frequency of snapshot validation failures in the delta collection process for that client machine. As yet another example, the patch history data may be analyzed to determine how often cloning or reversion occurs for this particular type of client machine. In some embodiments, these types of metrics may be reported as another type of assessment report, and provided to the user via a user interface such as the assessment reporting interface 249 of FIG. 2.

Figure 8:
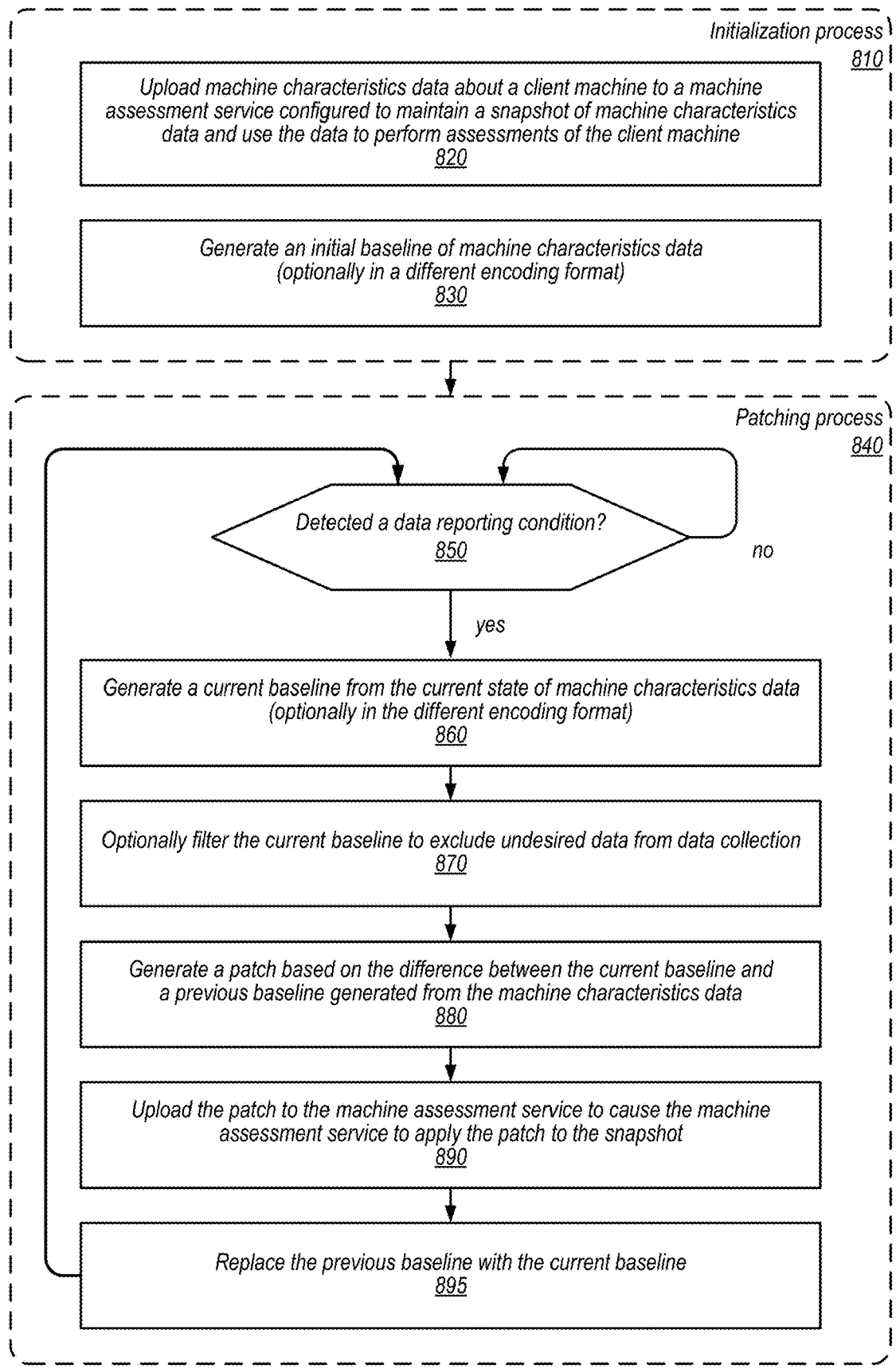
FIG. 8 is a flowchart illustrating a process of collecting machine characteristics data using a delta data collection technique, according to some embodiments.

FIG. 8 is a flowchart illustrating a process of collecting machine characteristics data using a delta data collection technique, according to some embodiments. The depicted process may be performed by a client machine (e.g. the client machine 110 of FIG. 1), or an agent executing on such a client machine (e.g. the agent 212 of FIG. 2).

As shown, operations 820 and 830 may be performed as part of an initialization process for the delta data collection, and may be performed in any order. At operation 820, machine characteristics data about a client machine is updated to a machine assessment service (e.g. machine assessment service 130). The machine characteristics data (e.g. machine characteristics data 112) is the data that will be collected in an ongoing delta collection process to refresh a snapshot of the data at the machine assessment service. In some embodiments, the machine assessment service may build a virtual representation of the client machine using snapshots of multiple categories of machine characteristics data collected using independent delta collection processes. The virtual representation of the client machine may be used by the service to perform periodic assessment of the machine, for example, to check for security vulnerabilities of the machine. In some embodiments, the machine characteristics data may be a WINDOWS registry hive, and the initial uploaded version of the data may be a binary encoded version of the hive blob.

At operation 830, another version of the machine characteristics data is generated as an initial baseline, which may be generate in a different encoding format as the actual machine characteristics data. In some embodiments, the machine characteristics data is stored in a text encoding format that encodes data as individual text characters in a defined character set, and the initial baseline is generated in a binary encoding format that does not encode data as text characters. In some embodiments, the machine characteristics data may be stored in a binary encoding format and the initial baseline may be generated in a text encoding format. For example, where the machine characteristics data is a WINDOWS registry hive, the initial baseline may be generated as a text-based .reg file.

After the initialization process 810, the delta collection process proceeds to an iterative patching process 840 to generate successive patches for the snapshot data maintained by the machine assessment service. The patching process 840 begins at operation 850, where a reporting condition or triggering condition for a patch is detected. The detection may be performed by a component such as the job schedule 310 of FIG. 3. In some embodiments, patches may be generated based on an occurrence of a scheduled data report. In some embodiments, patches may be generated upon the detection of an event at the client machine, or in response a request from a user or an instruction from the machine assessment service.

If a data reporting condition is detected, the process proceeds to operation 860. At operation 860, a current baseline is generated from the current state of the machine characteristics data. In some embodiments, the current baseline may be generated in the same manner as the initial baseline of operation 830. Like the initial baseline, the current baseline may be generated in an encoding format that is different from the native format of the machine characteristics data. For example, where the machine characteristics data is a WINDOWS registry hive, the current baseline may be a text-based .reg file. The .reg file may be generated in a sorted order, for example, in alphanumeric order of the registry keys.

At operation 870, the current baseline is filtered to exclude certain undesired data from the delta collection process. In some embodiments, the filtering may be performed by component such as the data filter 540 of FIG. 5. In some embodiments, the filtering may be controlled by a set of filtering rules, which may be configurable via a configuration interface. Depending on the configuration or embodiment, the filtering rules may filter out machine data that are highly volatile or not useful to the machine assessment service. For example, where the baseline contains a WINDOWS registry data, the filtering may be configured to exclude registry data items such as random seeds used by WINDOWS, performance or debugging metrics generated by WINDOWS, among others. In some embodiments, the filtering rules may include filtering logic, for example, to exclude certain machine characteristics data based on the content of other machine characteristics data, or based on external conditions.

At operation 880, a patch is generated based on the difference between the current baseline and a previous baseline generated from the machine characteristics data. In some embodiments, operation 880 may be performed by a component such as the patch generator 124 of FIG. 1. Depending on the embodiment, the difference between the two baselines may be determined using different types of comparators. In some embodiments, the comparator may be a textual comparator, which may be line-based or byte-based. In some embodiments, the comparator may be configured to compare binary encoded data. In some embodiments, the resulting patch may be generated as text encoded data. In other embodiments, the patch may be generated as binary encoded data. In embodiments where the baselines are .reg files, the comparator may be a line-based textual comparator, and the resulting patch may be another .reg file.

At operation 890, the patch is uploaded to the machine assessment service. The machine assessment service may be configured to take the patch and apply it to the snapshot of the machine characteristics data to update the data to the state of the current baseline. In some embodiments, the patch application may be performed by a component such as the patch applicator 150 of FIG. 1. In embodiments where the snapshot is a static registry hive of WINDOWS registry data, the patch application process may apply the patch (e.g. a .reg file) directly onto the static hive. The application may be performed using a custom hive writer that is capable of writing static hive blobs. In some embodiments, the hive writer may be customized to use an efficient memory allocation policy that reuses allocated memory locations for new or changed registry entries during the patch application process. The reused memory locations may hold obsolete registry data that can be overwritten, and the memory allocator may select such memory locations using a first-fit or best-fit algorithm.

At operation 895, the previous baseline at the client machine is replace with the current baseline, so that the current baseline can be used as the previous baseline for the next patch cycle. In some embodiments, the delta collection process may overwrite previous baseline with the current baseline. In some embodiments, the delta collection process may maintain a history of past baselines, but designate the current baseline as the last baseline. The patching process will then repeat for subsequent data reporting conditions, to continually generate patches for the machine characteristics data and apply the patches to the snapshot to keep the snapshot up to date with the client machine data.

Figure 9:
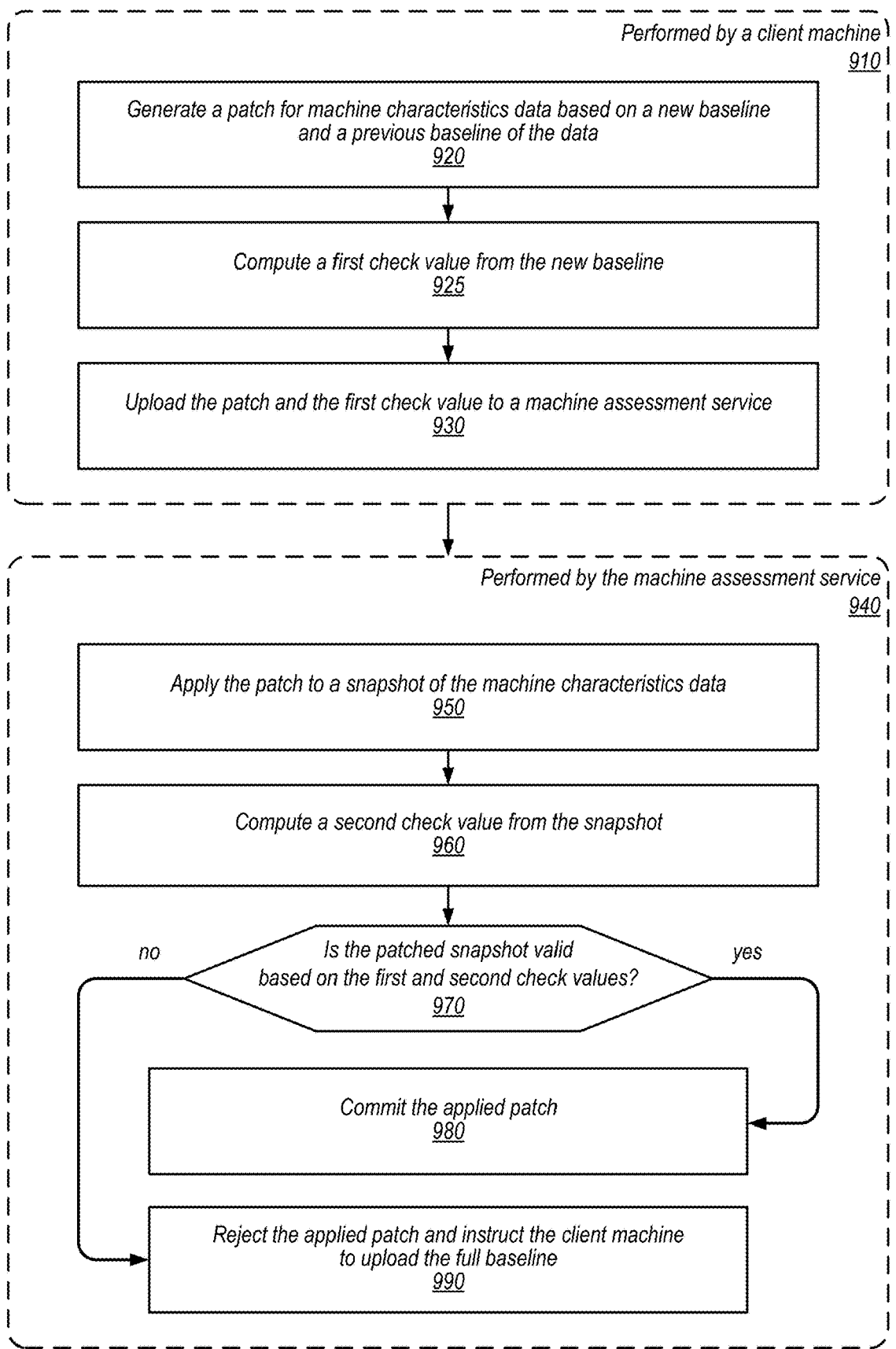
FIG. 9 is a flowchart illustrating a process of validating patched snapshots in a delta data collection process, according to some embodiments.

FIG. 9 is a flowchart illustrating a process of validating patched snapshots in a delta data collection process, according to some embodiments.

As shown, operations 920, 925, and 930 may be performed by the client machine (e.g. agent 212 on the client machine 110). At operation 920, a patch is generated for machine characteristics data about the client machine, based on a new baseline and a previous baseline of the data. Operation 920 may be performed by 124 as discussed in connection with FIGS. 1 and 5, and performed in similar fashion as discussed in connection with operation 880 of FIG. 8.

At operation 925, a first check value is computed from the new baseline. The check value may be generated as a hash value or checksum value of the new baseline. The check value may be generated so that identical baselines will always produce the same check value, and different baselines will produce different check values with high probability. In some embodiments, the check value may be an MD5 hash value of the new baseline.

At operation 930, the patch and first check value are uploaded to the machine assessment service. Operation 930 may be performed in similar fashion as operation 330 of FIG. 3. In some embodiments, the check value patch may be uploaded separately. For example, the check value may be uploaded as part of a job completion event via a first service interface of the machine assessment service, and the patch may be uploaded via a second service interface of the machine assessment service.

As shown, operations 950, 960, 970, 980, and 990 may be performed by the machine assessment service. At operation 950, the received patch from the client machine is applied to the snapshot of machine characteristics data maintained by the machine assessments service. Operations 950 may be performed by a component such as the patch applier 150 of FIGS. 1 and 5, and in similar fashion as discussed in connection with operation 890 of FIG. 8.

At operation 960, a second check value is computed from the snapshot, after the application of the patch. The second check value may be a hash value (e.g. an MD5 hash) or a checksum computed based on the contents of the snapshot. The second check value may be computed using the same method as the first check value. Thus, if the contents of the snapshot match the contents of the new baseline generated at the machine, the second check value should match the first check value.

At operation 970, a determination is made whether snapshot is valid after the patch application. The validation or verification of the snapshot may be performed by comparing the first and second check values. If the two check values are the same, the snapshot may be deemed valid, and the process proceeds to operation 980. If the two check values are not the same, the process proceeds to operation 990. In some embodiments, multiple types of check values may be used to validate or verify the patched snapshot.

If patched snapshot is validated, at operation 980, the applied patch is committed. In some embodiments, the committing of the patch may include designating the patched snapshot as the definitive snapshot for the machine characteristics data, and opening the snapshot to be used for assessment processes of the machine assessment service.

If the patched snapshot is not validated, at operation 990, the applied patch is rejected, and the client machine is instructed to upload the full baseline instead. In some embodiments, the rejection of the applied patch may include invalidating the snapshot itself. In some embodiments, the rejection of the patch may cause the snapshot to be rolled back to a previous state before the patch was applied. In some embodiments, the instruction to the client machine may be sent via the agent manager 242, and in a similar manner as operation 344, discussed in connection with FIG. 3.

Figure 10:
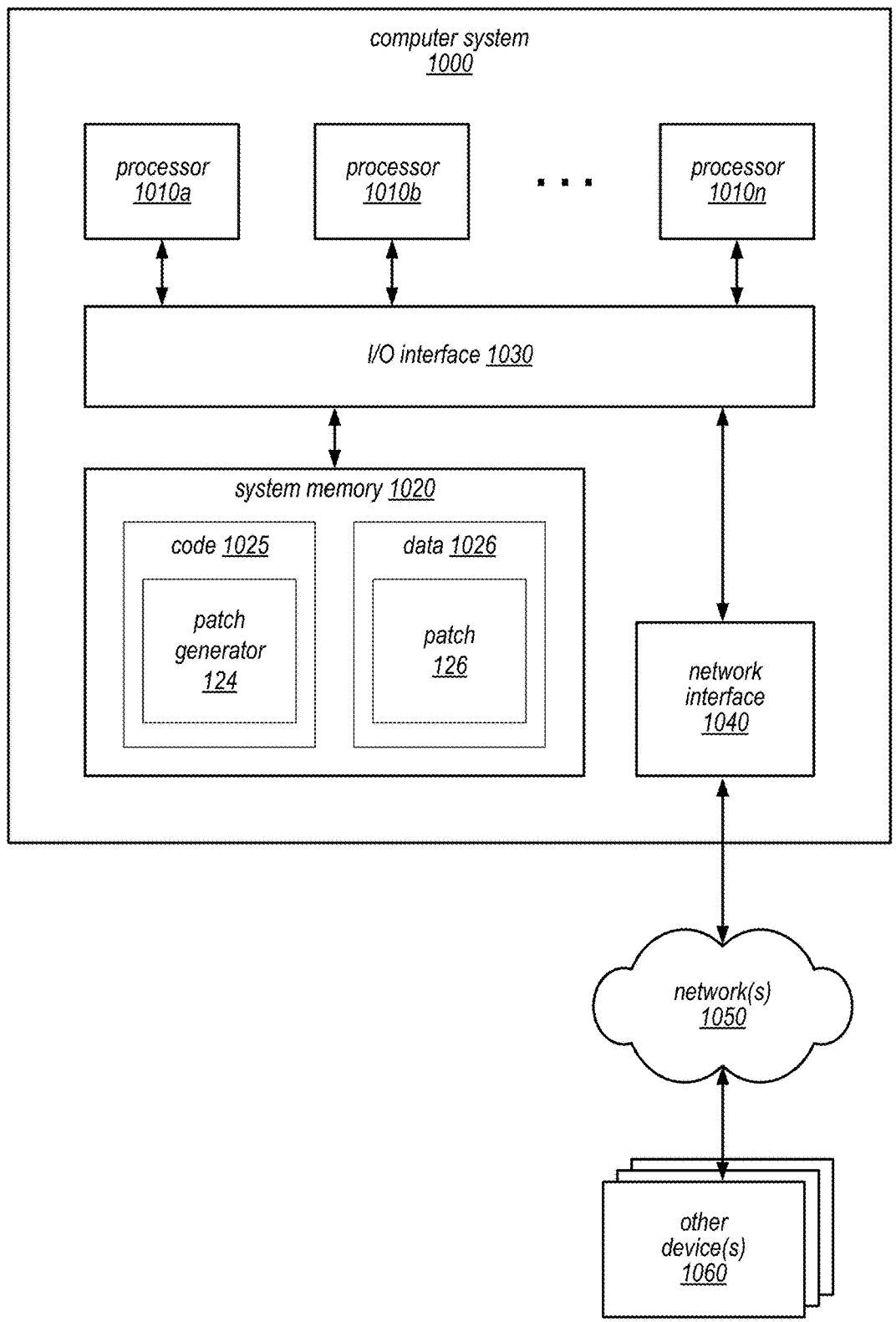
FIG. 10 is a block diagram illustrating an example computer system that can be used to implement a client machine or one or more portions of a machine assessment system that implements a delta data collection technique for collecting machine characteristics data, according to some embodiments.

FIG. 10 is a block diagram illustrating an example computer system that can be used to implement a client machine or one or more portions of a machine assessment system that implements a delta data collection technique for collecting machine characteristics data, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the patch generator 124, as discussed. The system memory 1020 may also be used to store data 1026 needed by the executable instructions. For example, the in-memory data 1026 may include portions of a patch 126, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
   one or more hardware processors with associated memory that implement a client machine monitored by a machine assessment service, configured to:
   maintain a repository of machine characteristics data about the client machine, wherein the repository is stored as a plurality of keys or key-value pairs and in a binary encoding format;
   at an initial time:

generate an initial baseline of the repository of machine characteristics data about the client machine, wherein the initial baseline is generated in a text encoding format with keys sorted in an alphanumeric order, and an initial check value of the initial baseline, wherein the initial check value is generated by applying one or more hash functions to the initial baseline, and upload the machine characteristics data in the binary encoding format to the machine assessment service, wherein the machine assessment service is configured to maintain a snapshot of machine characteristics data in the binary encoding format; and at one or more times after the initial time:

generate, in the text encoding format, a current baseline from a current state of the machine characteristics data, wherein keys in the current baseline are sorted in the alphanumeric order, and a current check value of the current baseline, wherein the current check value is generated by applying the one or more hash functions to the current baseline, obtain a previous baseline in the text encoding format generated from a previous state of the machine characteristics data, determine that the current baseline is different from the previous baseline based at least in part on a comparison of the current check value and a previous check value generated from the previous baseline, generate a patch based at least in part on a difference between the current baseline and the previous baseline, and upload the patch to the machine assessment service, wherein the upload causes the machine assessment service to apply the patch to the snapshot to reflect the current baseline and perform one or more assessments of the client machine for one or more security vulnerabilities using the snapshot.

2. The system of claim 1, wherein
the repository of machine characteristics data comprises a registry hive on the client machine.

3. The system of claim 1, wherein the client machine is configured to:
generate the current baseline as a text file indicating at least some of the plurality of keys or key-value pairs sorted according to their respective keys;
determine the difference as a text difference between the text file and a previous text file representing the previous baseline; and
generate the patch as an output text file indicating the text difference.

4. The system of claim 3, wherein,
the machine assessment service is configured to maintain the snapshot as a static registry hive in the binary encoding format, and
the uploading of the patch causes the machine assessment service to merge contents of the output text file into the static registry hive.

5. The system of claim 1, wherein
the client machine is configured to generate the patch in the binary encoding format.

6. The system of claim 1, wherein
the client machine is configured to generate the patch in response to one or more of:
an occurrence of a scheduled data report,
an event detected on the client machine, or
a request from the machine assessment service.

7. The system of claim 1, wherein to generate the patch, the client machine is configured to:
determine the difference between the current baseline and the previous baseline according to a set of one or more filtering rules, wherein the one or more filtering rules excludes one or more elements of the machine characteristics data during the determination of the difference.

8. A method, comprising:
performing, by one or more hardware processors with associated memory that implement a client machine monitored by a machine assessment service:
maintain a repository of machine characteristics data about the client machine, wherein the repository is stored as a plurality of keys or key-value pairs and in a binary encoding format;
at an initial time:

generating an initial baseline of the repository of machine characteristics data about the client machine, wherein the initial baseline is generated in a text encoding format with keys sorted in an alphanumeric order, and an initial check value of the initial baseline, wherein the initial check value is generated by applying one or more hash functions to the initial baseline, and uploading the machine characteristics data in the binary encoding format to the machine assessment service, wherein the machine assessment service is configured to maintain a snapshot of machine characteristics data in the binary encoding format; and at one or more times after the initial time:

generating, in the text encoding format, a current baseline from a current state of the machine characteristics data, wherein keys in the current baseline are sorted in the alphanumeric order, and a current check value of the current baseline, wherein the current check value is generated by applying the one or more hash functions to the current baseline, obtaining a previous baseline in the text encoding format generated from a previous state of the machine characteristics data, determining that the current baseline is different from the previous baseline based at least in part on a comparison of the current check value and a previous check value generated from the previous baseline, generating a patch based at least in part on a difference between the current baseline and the previous baseline, and uploading the patch to the machine assessment service, wherein the uploading of the patch causes the machine assessment service to apply the patch to the snapshot to reflect the current baseline and perform one or more assessments of the client machine for one or more security vulnerabilities using the snapshot.

9. The method of claim 8, wherein
the uploading of the patch is performed by an agent executing on the client machine,
the agent is configured to upload patches for different categories of machine characteristics data, including patches for at least one category of machine characteristics data that are generated without converting the category of machine characteristics data into a different encoding format, and
the machine assessment service is configured to store snapshots of the different categories of machine characteristics data to build a virtual representation of the client machine.

10. The method of claim 9, wherein
the one category of machine characteristics data comprises a set of files on the client machine, and
the method further comprises, generating, by the agent, a new patch to be applied on a snapshot of the set of files, and a set of instructions for applying the new patch, specifying one or more of:
copying a file in the new patch into a next snapshot,
copying a file in the snapshot into the next snapshot,
removing a file indicated by the new patch from the next snapshot, or
updating contents of a file in the snapshot with patch data in the new patch and copying the file into the next snapshot.

11. The method of claim 9, further comprising performing, by the agent:
obtaining a new baseline of the one category of machine characteristics data;
generating a new patch based at least in part on the new baseline;
computing a check value of the new baseline using the one or more hash functions;
uploading the new patch and the check value to the machine assessment service, wherein the machine assessment service is configured to apply the new patch to a snapshot for the category of machine characteristics data and then validate the snapshot by comparing the check value with another check value computed from the snapshot using the one or more hash functions; and
responsive to an indication from the machine assessment service that the validation was not successful, uploading the new baseline to the machine assessment service.

12. The method of claim 8, wherein,
the generating and uploading of patches are performed in response to one or more of:
an occurrence of a scheduled data report,
an event detected on the client machine, or
a request from the machine assessment service.

13. The method of claim 8, further comprising performing, by the client machine:
compressing the patch using a data compression technique before uploading patch to the machine assessment service.

14. One or more non-transitory computer-accessible storage media storing program instructions that when executed on or across one or more processors implement at least a portion of a machine assessment service, wherein the program instructions when executed on or across the one or more processors cause the machine assessment service to:
receive, from a client machine, an initial baseline of a repository of machine characteristics data about the client machine, wherein the initial baseline specifies a plurality of keys or key-value pairs in a binary encoding format;
create, at the machine assessment service, a snapshot of the machine characteristics data in the binary encoding format using the initial baseline; and
at one or more times subsequent to the creation of the snapshot:
receive a patch for the snapshot from the client machine, wherein the patch is in a text encoding format with keys sorted in an alphanumeric order,
receive a check value from the client machine, wherein the check value is generated by applying one or more hash functions to a current state of the machine characteristics data at the client machine,
apply the patch to the snapshot to update the snapshot to the current state of the machine characteristics data at the client machine,
generate a second check value by applying the one or more hash functions to the updated snapshot,
validate the updated snapshot based at least in part on a comparison of the check value and the second check value, and
initiate one or more assessments of the client machine using the updated snapshot, wherein the one or more assessments assesses the client machine for one or more security vulnerabilities.

15. The one or more non-transitory computer-accessible storage media of claim 14, wherein,
to create the snapshot at the machine assessment service, the program instructions when executed on or across the one or more processors cause the machine assessment service to create a static registry hive, wherein the static registry hive contains at least a portion of data stored in an active registry hive of the client machine, and
to apply the patch to the snapshot, the program instructions when executed on or across the one or more processors cause the machine assessment service to apply a patch file to the static registry hive.

16. The one or more non-transitory computer-accessible storage media of claim 15, wherein to apply the patch to the snapshot, the program instructions when executed on or across the one or more processors cause the machine assessment service to:
determine, from the patch file, a new entry to be created in the static registry hive;
allocate a memory location in the static registry hive for the new entry, wherein the memory location holds obsolete data and has sufficient size to store the new entry; and
reuse an obsolete memory location to store the new entry.

17. The one or more non-transitory computer-accessible storage media of claim 14, wherein the program instructions when executed on or across the one or more processors cause the machine assessment service to:
receive, from the client machine, patches for multiple different categories of machine characteristics data; and
store snapshots of the multiple different categories of machine characteristics data as part of a virtual representation of the client machine.

18. The one or more non-transitory computer-accessible storage media of claim 14, wherein the program instructions when executed on or across the one or more processors cause the machine assessment service to:
store a sequence of patches from the client machine in a sequence order; and
analyze the sequence of patches to determine one or more metrics of the client machine, including one or more of:
a frequency of change of the machine characteristics data of the client machine; or
a frequency of snapshot validation errors for patches received from the client machine.

19. The one or more non-transitory computer-accessible storage media of claim 18, wherein the program instructions when executed on or across the one or more processors cause the machine assessment service to:
determine, based at least in part on the sequence of patches and a new patch received from the client machine, that the client machine is a clone of another client machine that has sent patches to the machine assessment service; and responsive to the determination that the client machine is a clone, send a message instructing the client machine to use a new identifier for uploading further patches.

20. The one or more non-transitory computer-accessible storage media of claim 18, wherein the program instructions when executed on or across the one or more processors cause the machine assessment service to:
determine that a new patch received from the client machine is not valid with respect to a current snapshot state of the client machine maintained by the machine assessment service;
determine that the new patch is valid with respect to a former snapshot state indicated by the sequence of patches; and
responsive to the determination that the new patch is valid with respect to the former snapshot state, apply the new patch to the former snapshot state to create a new branch in the sequence of patches for the client machine, without requesting a new baseline to be collected from the client machine.

* * * * *